United States Patent [19]

Ishida et al.

[11] Patent Number: 4,754,325
[45] Date of Patent: Jun. 28, 1988

[54] METHOD AND APPARATUS FOR PRODUCING A COLOR-SEPARATION FILM BY RECORDING AT LEAST ONE TRIMMED COLOR-SEPARATION IMAGE AND A MASKING REGION SIMULTANEOUSLY

[75] Inventors: Akira Ishida; Akira Yumen; Naotada Saito, all of Kyoto, Japan

[73] Assignee: Dainippon Screen Mfg. Co., Ltd., Japan

[21] Appl. No.: 774,652

[22] Filed: Sep. 11, 1985

[30] Foreign Application Priority Data

Feb. 9, 1985 [JP] Japan .................. 60-22794

[51] Int. Cl.$^4$ .................. H04N 1/46; H04N 1/04; H04N 1/06; H04N 1/387
[52] U.S. Cl. .................. 358/75; 358/280; 358/285; 358/290
[58] Field of Search .................. 358/75, 78, 80, 280, 358/282, 283, 256, 294, 285, 289, 290, 291

[56] References Cited

U.S. PATENT DOCUMENTS 4,538,185 8/1985 Wiggins .................. 358/294
4,646,144 2/1987 Ishida et al. .................. 358/75

FOREIGN PATENT DOCUMENTS 57-124351 8/1982 Japan .
58-165478 9/1983 Japan .
59-226348 12/1984 Japan .

Primary Examiner—James J. Groody
Assistant Examiner—Randall S. Svihla
Attorney, Agent, or Firm—Ostrolenk, Faber, Gerb & Soffen

[57] ABSTRACT

A color-separation film is produced for one or more original pictures which require trimming by carrying out a separation process by means of a color scanner. The original pictures are adhered to a light-shielding sheet. The light-shielding sheet is provided with trimming windows through which all or portions of the original pictures are viewable. The shielding sheet and the original pictures viewable therethrough are scanned to obtain color-separated images which images are then recorded on a photosensitive sheet which is mounted on a recording cylinder. Further, a binary-coded signal is developed which indicates the regions on the light-shielding sheet which lie outside the trimming windows. The binary-coded picture signal is used for forming a mask region on the photosensitive sheet. Accordingly, a subsequent contact-printing procedure is simplified and the printing process can be carried out more reliably and accurately.

4 Claims, 3 Drawing Sheets (a)

(b)

METHOD AND APPARATUS FOR PRODUCING A COLOR-SEPARATION FILM BY RECORDING AT LEAST ONE TRIMMED COLOR-SEPARATION IMAGE AND A MASKING REGION SIMULTANEOUSLY

BACKGROUND OF THE INVENTION

This invention relates to a method for producing a color-separation film in accordance with a printing plate fabrication technique making use of a color scanner, in which the color-separation film includes both the picture being scanned and a mask region serving as an outlining mask which is required in a subsequent treatment step, the mask region being formed on the color-separation film concurrently with the recordation of the picture.

In recent processes for producing printing plates, preparation steps such as machine plate preparation steps and block copy preparation steps have been required. Layout scanners which can achieve electronic performance of most of such steps have been finding utility in some areas.

The conventional process is, however, still in wide use. In this process, color-separation pictures are produced by means of a color scanner, after which they are pasted up and assembled by manual and contact exposure work respectively.

To make the pasting-up and assembly work simpler, original color pictures are sometimes pasted up on a layer sheet in accordance with the desired layout pattern so as to provide a pasted-up original color page picture. The original color page picture is then scanned by means of a color scanner so as to color-separate the compound color page picture as a whole (see, for example, Japanese Unexamined Patent Publication (Kokai) No. 59-226348.

FIG. 5 illustrates a process for producing a printing plate by making use of the conventional multiple exposure and printing technique. Original picture patterns $B_1$, $B_2$, $B_3$, which require color separation and halftone photography are pasted up on the layout sheet C in accordance with the desired layout pattern. The sheet C is then mounted on an input cylinder A. The original picture patterns $B_1$, $B_2$, $B_3$ are subjected to color separation and halftone photography and recorded with the same dimensions as a halftone negative on a recording film E mounted on a recording cylinder D to produce a picture pattern negative E'.

For the original picture patterns $B_1$, $B_2$, $B_3$, it is possible to use an intermediate picture which has in advance been reproduced, with a magnification designated upon preparation of a layout pattern, on a color duplicate film or color photographic paper from an original such as color film or the like by means of a duplicate camera. At this time, in order to facilitate simultaneous processing by a color scanner, original picture patterns to be pasted up on a common pasting-up layout sheet C (e.g., a transparent film or white paper sheet which may optionally be equipped with registration marks or the like as desired) are subjected to balancing such as gradation.

In order to assemble characters, line pictures and/or the like together with the picture patterns on a layout sheet C, it is necessary to prepare a negative (F) which includes both line pictures and a line picture block copy of these characters and a trimming layout mask G which includes trimming regions for the picture patterns (the trimming regions being rendered transparent at the location of the windows corresponding to the position of the pictures $B_1$, $B_2$, $B_3$ and the remaining parts being rendered opaque). Thereafter, the picture pattern negative E' and the layout mask G are placed in registration and contact exposed to form a film H which is then contact exposed with the line picture negative F so as to obtain a finished positive J.

This multiple contact exposure process requires correct positioning and registration of the various films. When it is necessary to obtain a layout making the boundaries of the picture patterns hardly noticeable, a high degree of accuracy is indispensable in positioning and registering a plurality of masking patterns relative to one another.

As an alternative process, intermediate pictures are produced respectively from originals on color duplicate films, the intermediates are cut into sizes which conform with their corresponding desired trimming frames, the thus-cut intermediates are pasted up on a transparent sheet, the transparent sheet is wrapped on an original cylinder with the originals in contact with the circumferential outer wall of the original cylinder, and the originals are then scanned.

The above process is however accompanied by a practical drawback that considerable difficulties are encountered upon cutting the desired trimming regions of the intermediates precisely in accordance with desired trimming sizes. It is also accompanied by an inconvenience that the process has to be repeated from the preparation of intermediates when the desired trimming frames are changed after color separation.

In Japanese Unexamined Patent Publication (Kokai) No. 59-226348 the present applicant has disclosed to prepare a color-separation film by recording and exposing picture patterns bearing not only characters and/or line pictures but also necessary rectangular masks on rectangular trimming regions.

However, Japanese Unexamined Patent Publication (Kokai) No. 59-226348 does not disclose anything about the recording of picture patterns with masks of desired shapes.

BRIEF DESCRIPTION OF THE INVENTION

An object of this invention is to record picture patterns only with a high accuracy level by a color scanner even if the shapes of the masks are complex, so that the superposing work of films in the abovedescribed multiple exposure process making use of a contact-printing printer can be effected using only a color-separation negative and a negative of characters, line pictures and/or the like.

In one aspect of this invention, there is provided a method for producing a color-separation film by color-separating one or more original pictures which require trimming, by means of a color scanner, said method comprising the steps of:

adhering the original picture to a trimming window of a light-shielding sheet-like member, which trimming window defines a trimming region for the original picture;

mounting the sheet-like member on an nput cylinder and photoelectrically scanning the sheet-like member by means of color-separating photoelectric conversion means equipped with a light source so as to generate picture signals of the color-separated images;

recording color-separation images of the original picture in the trimming window, which images have been detected by the photoelectric conversion means, on a photosensitive material supported on a recording cylinder;

generating as a function of said picture signals of the color-separation images, binary-coded picture signals which indicate the location of areas where the light generated by said light source is shielded by the sheet-like member; and recording masking images, on the photosensitive material as a function of the binary-coded picture signals.

In another aspect of this invention, there is also provided an apparatus suitable for use in the production of a color-separation film, which comprises:

means for dividing photoelectrically-converted signals into color-separation signals and binary-coded signals in accordance with their magnitudes; and recording means equipped with means for either transmitting or blocking the color-separation signals in accordance with the binary-coded signals.

According to the present invention, color-separation films of the same type as those obtained conventionally by using peelable masks in subsequent processing steps can be obtained directly by means of a color scanner without need for any post processing or treatment.

As a result of the foregoing, the subsequent contact-printing step requires fewer contact-printing processes in each of which the respective films must be superposed one over another with a high degree of accuracy. This has in turn brought about such advantageous effects that the reliability and accuracy of the contact printing work have been improved and the superposing work of films has been simplified and the work efficiency has hence been improved.

In the present invention, picture-recording signals adapted to mask trimming regions are produced from color-separation picture signals which have been output from the photoelectric conversion unit adapted to photoelectrically scan originals. It is therefore possible to record the masking areas of individual trimming regions with the resolution of the scanner without making any errors with respect to the scanned points.

As the recording unit, it is possible to employ either a recording device controlled by analog signals or a dot generator controlled by digital signals.

This invention may also be applied with ease to a scanner equipped with a recording unit which makes use of a contact screen.

BRIEF DESCRIPTION OF THE DRAWINGS

The above and other objects, features and advantages of the present invention will become apparent from the following description and appended claims, taken in conjunction with the accompanying drawings, in which:

DETAILED DESCRIPTION OF THE INVENTION

One embodiment of this invention will hereinafter be described in detail. Before describing this embodiment, the basic principle of this invention will first be briefly described.

Using a light-shielding white peel-off film (see, for example, Japanese Unexamined Patent Publication (Kokai) No. 57-124351), trimming regions are cut off and original pictures are superposed in registration with the trimming regions, respectively.

Since the above-mentioned white peel-off film has a good light-shielding property, the originals have to be prepared with densities lower than that of the white peel-off film.

Recording is then effected in such a way that each light-shielded area is recorded solid and each of the areas not light-shielded permits transmission of light, thereby obtaining a color-separation picture of the same quality as conventional color-separation pictures.

In the manner mentioned above, a color-separation picture which has been masked and trimmed is prepared.

Figure 1:
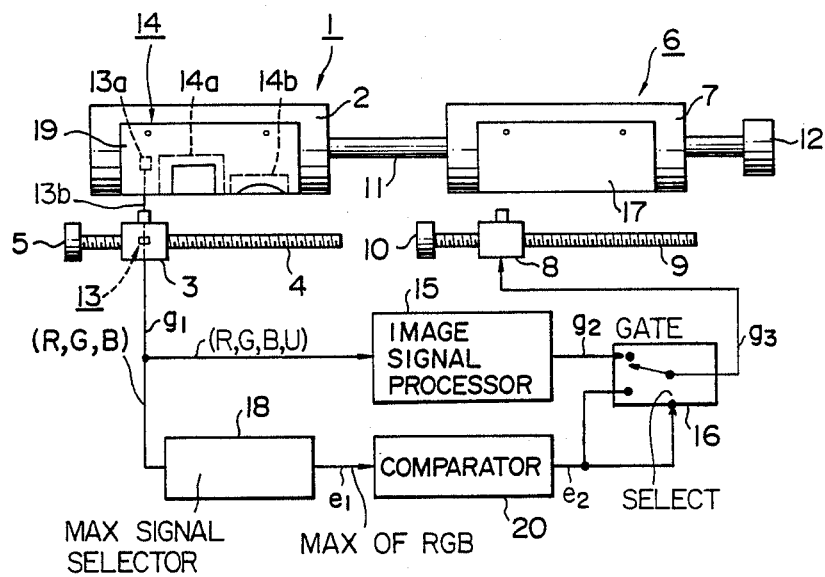
FIG. 1 is a block diagram of a color scanner in which the present invention has been incorporated.

FIG. 1 illustrates the structure of a color scanner according to this invention. An input unit 1 is provided with an input cylinder 2, input head 3, sub-scanning feed screw 4 for the input head 3, and a motor 5 for driving the feed screw 4. A recording unit 6 is provided with a recording cylinder 7, recording head 8 of the dot generator type, a sub-scanning feed screw 9 for the recording head 8, and a motor 10 for driving the feed screw 9.

The input cylinder 2 and recording cylinder 7 are both rotated by a motor 12, which drives a rotary shaft 11 common to both of the input cylinder 2 and recording cylinder 7. As a result of the rotation of the input cylinder 2 and recording cylinder 7, a main scanning of each of the input unit 1 and recording unit 6 is performed.

A photoelectrical conversion unit 13 of the input head 3 scans original pictures 14a, 14b of a scanned original picture 14 mounted on the peripheral wall of the input cylinder 2 photoelectrically and generates color-separation picture signals $g_1$ consisting of conventional three color signals R, G, B, which correspond respectively to red, green and blue, and an unsharp signal U for emphasizing contours.

The color-separation picture signals $g_1$ are then applied to a image signal processor 15, in which they are subjected to masking, color correction, gradation correction, etc. in the same manner as conventional methods.

Output signals $g_2$ of the picture signal processing circuit 1 are then fed to the recording head 8 via gate 16. When the lower input of the gate 16 is "L" (low), the color-separation picture signals which are similar to conventional color-separation picture signals are recorded on a photosensitive recording material 17 mounted on the recording cylinder 7.

On the other hand, the photoelectric conversion unit 13 of the input head 3 is designed in such a way that the three color signals R, G, B of the output color-separation picture signals $g_1$ are delivered to a maximum signal selector 18 which selects the color signal having the largest value so as to obtain a light/dark signal $e_1$ as an output of the selector 18.

The light-dark signal $e_1$ is used to detect areas in which a patching sheet 19 with the original pictures pasted up thereon shields light from a light source 13a.

This light/dark signal $e_1$ is converted into a binary-coded signal $e_2$ in accordance with the threshold of a comparator 20. The resultant binary-coded signal $e_2$ is fed to the lower input terminal of the gate 16.

When an area shielding the light from the light source 13a is detected in the course of the above-described process, the recording head 8 outputs exposing light of the maximum light quantity level when the output $e_2$ of the comparator 20 is "H" (high). Thus, the photosensitive material 17 is exposed to blacken the corresponding area so that the corresponding area has a light-shielding property after its development.

When the binary-coded signal $e_2$ is "L" on the other hand, the output signal $g_2$ is passed through the gate 16 as an output signal $g_3$ as is. The output signal $g_3$ is recorded with a halftone dot area percent which corresponds only to the level of the output signal $g_2$ of the picture signal processing circuit 15. Gate 16 can assume the form of a single pole double throw switch as seen in FIG. 1. In this embodiment, binary-coded signal $e_2$ is connected to the select (control) terminal of the switch and to one of the contacts. The other contact is coupled to output signal $g_2$. Therefore, when the signal $e_2$ is high, that same signal is passed to the output and the signal $g_3$ is high. On the other hand, when the signal $e_2$ is low, the output signal $g_3$ is, in effect, the signal $g_2$.

Figure 2:
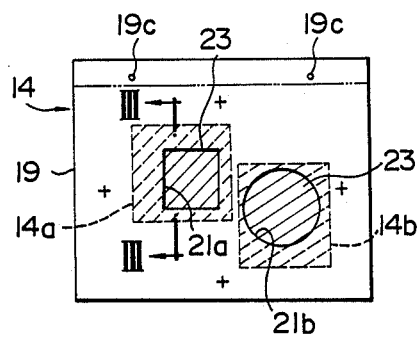
FIG. 2 shows a plan view of an original picture (a) to be mounted on an input unit of a color scanner for its scanning as well as a plan view of an output picture (b) thereof.
Figure 2:
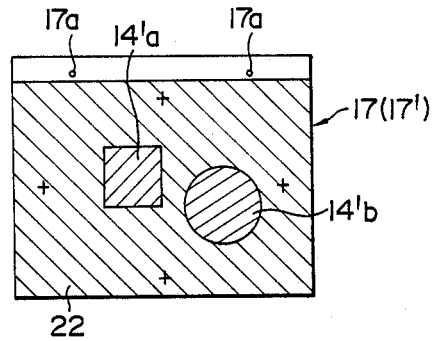

In FIG. 2, (a) is a plan view of a scanned original picture 14 to be mounted on the input cylinder 2, namely, a patching layout sheet 19 with the original pictures 14a, 14b pasted thereon, in which the layout sheet 19 is seen from the side of the input head 3. In FIG. 2, (b) is a front view of the scanned original picture 14 shown in (a) of FIG. 2 after reproduced and recorded on the photosensitive material 17 mounted on the recording cylinder 7 and then subjected to a development treatment, in which the thus-recorded original picture is viewed from the side of the recording head 8.

Figure 3:
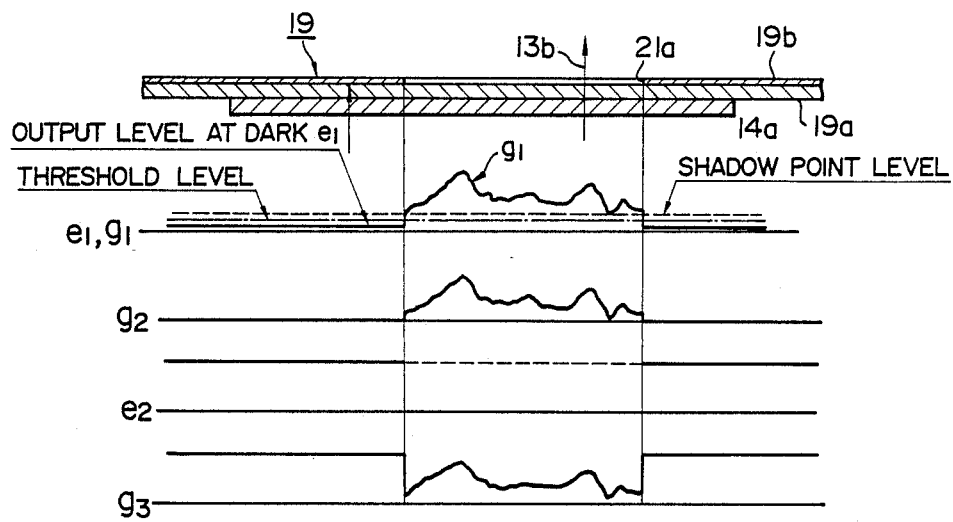
FIG. 3 illustrates a cross-sectional view of the scanned original picture (a) of FIG. 2 taken along line III—III and viewed in the direction indicated by the arrows as well as a schematic diagram showing the waveforms of signals converted photoelectrically by the cross-sectioned part in comparison with the cross-sectioned part.

As illustrated in FIG. 3 which will be described herein, the patching layout sheet 19 is a sheet-like material formed by laminating a transparent film base 19a having good light transmissibility and a light-shielding peel layer 19b. The patching layout sheet 19 is provided with at least 2 registration holes 19c ((a) of FIG. 2) which are to be registered with register pins for precise positioning.

The photosensitive material 17 is of substantially the same dimensions as the patching layout sheet 19. This photosensitive material 17 is also provided with registration holes 17a which correspond respectively to the registration holes 19c.

The registration pins with which the registration holes 19c and registration holes 17a are brought into registration are provided with a diameter and pitch common to the input cylinder 2 and recording cylinder 7 of the scanner as well as a CAD (computer-aided design) system and contact-printing printer, which will be described herein, and other work-facilitating devices. These positioning means are employed routinely and their detailed description is thus omitted.

The patching layout sheet 19 is provided with trimming windows 21a, 21b formed by cutting through a peel 19b at areas where desired trimming regions corresponding to the original pictures 14a, 14b are laid out on the basis of a layout pattern specified in a patched and assembled sheet (hereinafter called "layout sheet of completed block copy").

Since the cutting step of the trimming windows 21a, 21b is not directly related to the features of this invention, its details are not described here. It is substantially the same as the cutting step for conventional red peel films.

Where high degrees of accuracy such as "precise registration" is required, it is however preferred to position and cut the contours of designated trimming regions by a pattern processing technique such as CAD system or the like.

For the original pictures 14a, 14b pasted up on the patching layout sheet 19, it may be convenient to use intermediates of good duplicate film pictures which have been adjusted in color tone, gradation and the like in accordance with a desired magnification which is determined beforehand from the first original for its expansion or reduction.

Furthermore, the preparation of such a duplicate film is carried out in such a manner that transmitted light is allowed to remain to a certain extent in an area having the maximum density in the above duplicate film at the output level when the incident light is shielded by the peel layer 19b.

The pasting-up of the original pictures 14a, 14b onto the patching layout sheet 19 may be effected in the following manner. Namely, assuming that the peel layer 19b is on the front side of the layout sheet 19, the original pictures 14a, 14b are pasted up by adhesive tape or the like on the back side of the patching layout sheet 19, namely, on the transparent film base 19a in such a way that their front surfaces are brought into contact with the cylinder 2 and the trimming regions of the original pictures 14a, 14b are positioned and registered with their corresponding trimming windows 21a, 21b.

This pasting-up step of the original pictures 14a, 14b onto the patching layout sheet 19 is not different from conventional work, except that a conventional patching layout sheet formed of a sheet, which is transparent all over its surface, has been replaced by the patching layout sheet 19 equipped at one surface thereof with the peel layer 19b of this invention.

In FIG. 3, the color-separation picture signals $g_1$ output from the photoelectric conversion unit 13 (note: only one of the three channels, R, G and B, is shown) and the light/dark signal $e_1$ of the selector 18 are shown corresponding to the cross-sectional view of the patching layout sheet 19 and original picture 14a in FIG. 2.

The photoelectric conversion unit 13 serves to photoelectrically convert the original picture 14a inside the trimming window 21a, which is cut out of the peel layer 19b, by means of transmitting light 13b from the light source 13a.

The light/dark signal $e_1$ of the maximum signal selector 18 which selects the color signal having the largest value from the R, G, B signals output from the photoelectric conversion unit 13 produces a dark output at a density level higher than each shadow point of the original picture 14a at each area where the peel layer 19b still remains but at a level brighter than that of the shadow point at the area corresponding to each of the trimming windows 21a through which the original picture 14a is visible.

As a result of the difference in output level between the signal corresponding to each shadow point of the original picture 14a and the dark output corresponding to each point shielded from the transmitting light 13b by the peel layer 19b among the light/dark signals $e_1$ produced from the selector 18 are converted respectively into distinct binary-coded signals in accordance with a threshold set between these two levels in the comparator 20.

This comparator 20 produces binary-coded signals $e_2$ as "H"s when detecting the surface of the peel layer 19b.

Accordingly, a region 22 corresponding to the remaining part of the white peel 19b in the output picture shown in FIG. 2(b) is always subjected to exposure with a halftone dot area percent of 100% or higher so that printing light is successfully shielded upon its exposure, so that the region 22 is blackened to a density high enough to act as a mask.

In the trimming windows 21a, 21b, the original pictures 14a, 14b can be seen through the trimming regions 23 respectively. At the trimming regions 23, the signals $e_2$ are output as "L"s. The gate 16 receives the signals $e_2$ which are "L"s, and allows the output signals $g_2$ of the picture signal processing circuit 15 to pass therethrough as they are. Accordingly, picture signals similar to conventional picture signals are input to the recording head 8.

In the above-mentioned manner, trimmed and color-separation halftone pictures 14'a, 14'b are recorded.

In a color-separation film 17' which has been recorded and developed in the above manner, color-separation halftone negatives are formed at the regions corresponding to the halftone pictures 14'a, 14'b. All the remaining area is blackened to a high density. Unlike conventional techniques, the color-separation film 17' can then be used in the subsequent printer-dependent contact printing step without need for any layout masks.

In FIG. 3, the mounting on the cylinder 2 has been effected in the order of the original picture 14a, transparent film base 19a and peel layer 19b. So long as the peel layer 19b and original picture 14a can be distinguished in reflectivity from each other, they may be applied in the order of the original picture 14a, peel layer 19b and transparent film base 19a. Furthermore, the front surface of the original picture 14a may be located on the side of the white peel-off film.

The above description has been made on the assumption that the original pictures 14a, 14b are light-transmitting original pictures. The present invention may however be applied equally to light-reflective original pictures.

By making the surface reflectivity of the patching layout sheet 19 higher than the reflectivity of the maximum surface-reflecting area in a reflective original picture (i.e., the high light point in a positive), the difference in reflectivity between the original picture and patching layout sheet can be discriminated at the comparator 20.

Figure 4:
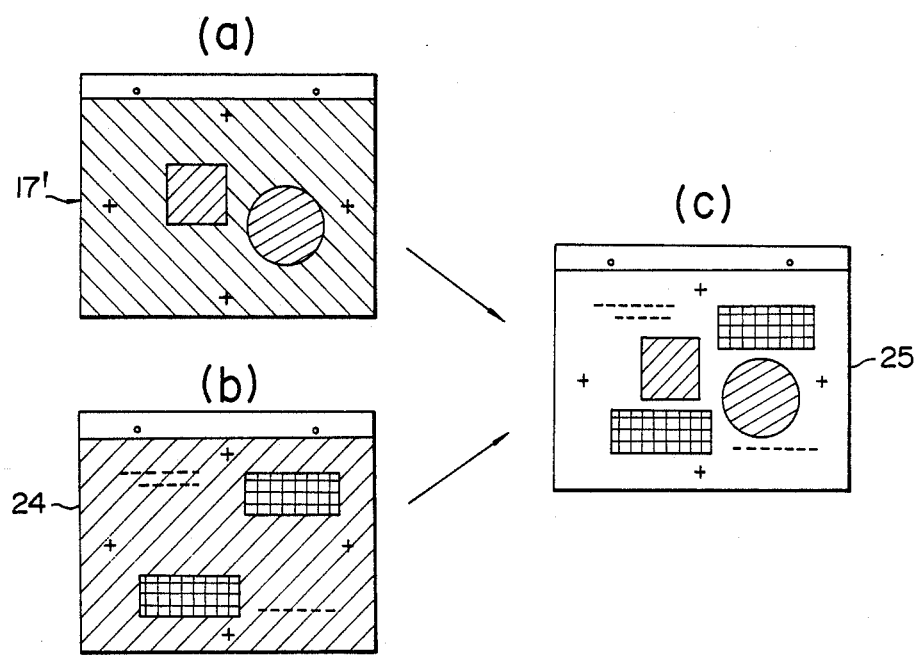
FIG. 4 shows a plan view of a color-separation film (a) obtained in accordance with this invention, a plan view of a line picture film prepared separately, and a plan view of a film (c) suitable for use in the production of a printing plate, the last-mentioned film having been obtained by subjecting both films to multiple exposure on a photosensitive material.
Figure 5:
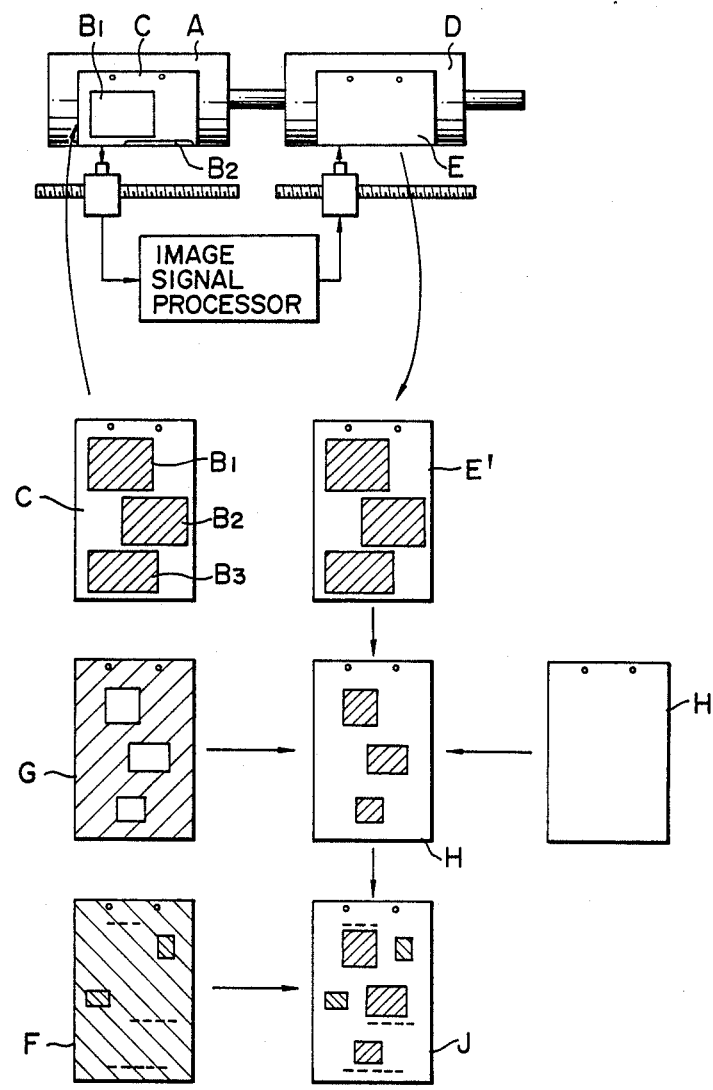
FIG. 5 shows a conventional process for the production of a printing plate, which makes use of a multiple exposure and printing step.

Portion (a) of FIG. 4 shows the color-separation picture 17' prepared in the above-described manner, while portion (b) of FIG. 4 illustrates a negative film 24 of line pictures such as characters, line pictures, flat tints, etc., which has been prepared separately from a completed block copy layout sheet. Portion (c) of FIG. 4 shows a final film original 25 which has been obtained by double-printing the films 17', 24 on another photosensitive material by means of a contact-printing printer and then developing the thus-printed photosensitive material and is useful in printing positive printing plates.

It is of course possible to double-print the color-separation film picture 17' and line film picture 24 directly on a presensitized plate. In this case, numeral 25 indicates a printing plate.

In this printer-dependent printing step, it is unnecessary to use any separate mask upon printing the color-separation film picture 17', the pin registration can be achieved with ease and the efficiency of the work is thus improved.

Use of the method of this invention results in improvements to both contact property and work efficiency, because the superposition of two or more films is not effected simultaneously in the operation of a contact-printing printer.

When a dot generator is used in the recording head 8, each contour may be photoelectrically detected with a high resolution and its corresponding smooth contour may hence be recorded provided that as disclosed by the present application in Japanese Unexamined Patent Publication (Kokai) No. 59-226348 a photodetector for color-separation printing plates and a photodetector for the detection of contours are provided as separate devices in the input head 3 and an array sensor is used as the contour-detecting photodetector.

As the gate 16, an analog switch may be used when the picture signals are analog signals while a gate device may also be used when the picture signal $g_2$ are digital signals.

Needless to say, the present invention may equally be practiced with a scanner which makes use of a contact screen.

The gate 16 serves to record a halftone dot area percent of 0% when the surface of the peel layer 19b has been detected and to send the color-separation signals $g_2$, which have been converted to positive signals, to the recording head 8 when the trimming windows 21a, 21b have been detected. Owing to this function of the gate 16, color-separation positive pictures with masks thereon [for example, the positive picture shown in FIG. 4(c)] can be exposed and recorded.

At each masked area, a separately-given halftone dot area percent (%) may be recorded.

The above embodiment has been described using the white peel-off film. Needless to say, the present invention can also be practised by using a light-shielding paper sheet which can function in much the same way as the white peel-off film.

Having now fully described the invention, it will be apparent to one of ordinary skill in the art that many changes and modifications can be made thereto without departing from the scope or spirit of the invention as set forth herein.

We claim:

1. A method for producing a color-separation film, utilizing a color scanner, by color-separating an original picture which requires trimming, said method comprising the steps of:
   adhering the original picture to a light-shielding sheet at a location thereof which places said original picture in a trimming window of said sheet, said trimming window defining a trimming region for the original picture;

mounting the combined sheet and original picture on an input cylinder, photoelectrically scanning the combined sheet and original picture by means of a color-separating photoelectric conversion means equipped with a light source, and generating picture signals representative of the combined sheet and original picture;

recording at least one color-separation image of the portion of the original picture located in the trimming window on a photosensitive sheet-like member mounted on a recording cylinder in accordance with said picture signals;

generating, as a function of said picture signals, a binary-coded signal which indicates the location of areas on said combined sheet and original picture where light generated by said light source is shielded by the light-shielding sheet; and recording a masking region on the photosensitive member as a function of the binary-coded signal, whereby said photosensitive member is transformed into said color-separation film.

2. A method according to claim 1, wherein the highest density of the original picture is lower than the density of the light-shielding sheet.

3. A method according to claim 1, wherein recording of said masking region and recording of said at least one color-separation image are carried out in a single recording operation.

4. Apparatus for producing a color-separation film, said apparatus comprising:

means for adhering an original picture which requires trimming to a trimming window of a light-shielding sheet to produce a combined sheet and original picture, said trimming window defining a trimming region for said original picture;

means for mounting said combined sheet and original picture on an input cylinder;

means for photoelectrically scanning the combined sheet and original picture by means of a color-separating photoelectric conversion means equipped with a light source and for generating picture signals representative of said combined sheet and original picture;

means for recording at least one color-separation image of the portion of said original picture located in the trimming window on a photosensitive sheet-like member mounted on a recording cylinder in accordance with said picture signals;

means for generating a binary-coded signal as a function of said picture signals, said binary-coded signal indicating the location of areas on said combined sheet and original picture light generated by said light source is shielded by said light-shielding sheet; and means for recording a masking region on the photosensitive sheet-like member as a function of said binary-coded signal whereby said photosensitive member is transformed into said color-separation film.

* * * * *